US012284212B2

(12) United States Patent
Keiter et al.

(10) Patent No.: US 12,284,212 B2
(45) Date of Patent: *Apr. 22, 2025

(54) DEFENSIVE DEEPFAKE FOR DETECTING SPOOFED ACCOUNTS

(71) Applicant: Bank of America Corporation, Charlotte, NC (US)

(72) Inventors: Kelly Renee-Drop Keiter, Waxhaw, NC (US); Michael Young, Davidson, NC (US); Kyle Mayers, Charlotte, NC (US); Sanjay Lohar, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/665,672

(22) Filed: May 16, 2024

(65) Prior Publication Data

US 2024/0305666 A1   Sep. 12, 2024

Related U.S. Application Data

(63) Continuation of application No. 17/885,764, filed on Aug. 11, 2022, now Pat. No. 12,063,249.

(51) Int. Cl.
*H04L 9/40* (2022.01)
*G06Q 50/00* (2012.01)
*G06V 40/16* (2022.01)
*G06V 40/30* (2022.01)
(Continued)

(52) U.S. Cl.
CPC ......... *H04L 63/1483* (2013.01); *G06Q 50/01* (2013.01); *G06V 40/171* (2022.01); *G06V 40/172* (2022.01); *G06V 40/33* (2022.01); *G06V 40/40* (2022.01); *G06V 40/50* (2022.01)

(58) Field of Classification Search
CPC .. H04L 63/1483; G06V 40/171; G06V 40/33; G06V 40/172; G06V 40/40; G06V 40/50; G06Q 50/01
See application file for complete search history.

(56) References Cited

U.S. PATENT DOCUMENTS

2021/0406568 A1* 12/2021 Liberman .............. G06V 10/82
2022/0129664 A1* 4/2022 Li ........................ G06V 40/193
(Continued)

*Primary Examiner* — Ayoub Alata
(74) *Attorney, Agent, or Firm* — Weiss & Arons LLP

(57) ABSTRACT

Apparatus and methods for using deepfakes defensively to detect fake, spoofed, and hoax accounts and posts on social media and elsewhere are provided. A program may gather verified images or writings of a target individual. The program may analyze the verified images and writings to create a baseline. The program may use deepfake algorithms to create exemplar deepfake images or writings. The program may store the data in a database. The program may search a network for social media accounts or posts that may meet the baseline and determine whether they are legitimate or illegitimate by comparing the contents of the accounts or posts with the exemplar deepfakes. When the program determines the accounts or posts are illegitimate, the program may initiate a takedown of those accounts or posts. The program may use machine learning algorithms to refine itself and become more accurate.

20 Claims, 6 Drawing Sheets

(51) Int. Cl.
*G06V 40/40* (2022.01)
*G06V 40/50* (2022.01)

(56) References Cited

U.S. PATENT DOCUMENTS

2022/0269922 A1* 8/2022 Mathews ............... G06V 20/46
2023/0009317 A1* 1/2023 Kang ................... G06N 3/0464

* cited by examiner

DEFENSIVE DEEPFAKE FOR DETECTING SPOOFED ACCOUNTS

CROSS REFERENCE TO RELATED APPLICATION

This application is a continuation of U.S. patent application Ser. No. 17/885,764, filed on Aug. 11, 2022 and entitled "DEFENSIVE DEEPFAKE FOR DETECTING SPOOFED ACCOUNTS," which is hereby incorporated by reference herein in its entirety.

FIELD OF TECHNOLOGY

Aspects of the disclosure relate to providing apparatus and methods for utilizing deepfakes defensively to detect fake, spoofed, and hoax accounts on social media and elsewhere.

BACKGROUND OF THE DISCLOSURE

Many individuals and entities have one or more social media accounts on widely available social media platforms, both free and paid. With the increased importance, visibility, and availability of social media to everyday interactions between people and companies, malicious activity has increased as well.

Malicious activity may include faking, spoofing, or creating hoax social media accounts or posts for individuals who may or may not have social media accounts of their own. (Spoofing may be defined as creating a fake account by identifying as another individual or entity.) For example, malicious actors may create a spoof account for an individual on a particular social media website where that individual does not already have an account. Or malicious actors may create a second, fake, account where an individual already has an account. In addition, malicious actors may create a fake or spoofed posting on a legitimate social media account.

This malicious activity may have deleterious and detrimental effects on the individual or entity that has been spoofed. Other persons and customers may confuse legitimate accounts and posts with illegitimate accounts and posts. The illegitimate accounts and posts may include incorrect and objectionable information. In addition, legitimate customers may be tricked into transferring funds to or signing agreements with malicious actors.

Further, it may take time and effort for individuals or entities to counteract or to takedown the spoofed and fake accounts and posts.

One method malicious actors may use to spoof or fake accounts or posts may be to utilize deepfake technology. Deepfake technology may refer to an image, recording, writing, or other individual identifier that has been convincingly altered and manipulated for misrepresentation and other purposes. Deepfakes may be more convincing and appear more accurate than typical altered images, recordings, and writings. Deepfake technology may be energy and processor intensive. Deepfake technology may be increasing in capability and credibility. Malicious actors may periodically improve their deepfake technology and algorithms.

Therefore, it would be desirable for apparatus and methods for utilizing deepfakes defensively to detect fake, spoofed, and hoax accounts and posts on social media and elsewhere and target those fake and spoofed accounts and posts for removal and deletion.

SUMMARY OF THE DISCLOSURE

It is an object of this disclosure to provide apparatus and methods for using deepfakes defensively to detect fake, spoofed, and hoax accounts and posts on social media and elsewhere and then target those fake and spoofed accounts and posts for removal and deletion.

A defensive deepfake computer program product is provided. The computer program product may include executable instructions. The executable instructions may be stored on non-transitory memory. The executable instructions may be executed by a processor on a computer system to perform various functions.

The program may gather two or more verified images of a target individual or entity.

The program may analyze the two or more verified images to determine one or more unique facial characteristics of the target individual or entity. The analysis may be performed through one or more artificial intelligence/machine learning ("AI/ML") algorithms.

The program may create, through one or more AI/ML deepfake algorithms, one or more deepfake images of the target individual or entity. The deepfake images may be used as exemplars of what a malicious actor may use in a spoofed or fake account or post.

The program may store the two or more verified images, the one or more unique facial characteristics, and the one or more deepfake images in a database. The database may be present on the same computer as the program or may be on a server or other computer distant from the program.

The program may search a network for one or more social media accounts that include the one or more unique facial characteristics. The network may be the Internet. The search may also include other characteristics of the target individual or entity, such as a name or names, account names, and other characteristics.

The program may compare any images on the one or more social media accounts with the one or more deepfake images and verified images. The program may determine when the one or more social media accounts are illegitimate through this comparison. For example, a social media account with a deepfake image may be illegitimate.

When the one or more social media accounts are determined to be illegitimate, the program may initiate a takedown request of the one or more social media accounts.

In an embodiment, the program may also request a response from a system administrator as to whether the determination that the one or more social media accounts are illegitimate is correct. For example, if the program determines that account X is illegitimate, the program may transmit the details of account X to an administrator for a human in the loop determination. This determination may be used to refine the comparison algorithm or other algorithms of the program.

In an embodiment, the system administrator may be the target individual. In this embodiment, the program may request the target individual verify or reject the determination that the social media account (s) are fake or spoofed.

In an embodiment, the database may be encrypted.

In an embodiment, the one or more facial characteristics, deepfake images, and other determinations may be repeatedly refined. The program may take feedback or analysis through AI/ML algorithms to refine various aspects of its operation, including the determination of facial characteristics, other characteristics, creation of deepfakes, comparison of accounts or posts to deepfakes, and determination of legitimate vs. illegitimate accounts or posts.

In an embodiment, the one or more social media accounts may include one or more photographs, one or more written posts, as well as other types of data.

In an embodiment, the program may also gather two or more verified writing samples of the target individual. The program may analyze, through one or more artificial intelligence/machine learning ("AI/ML") algorithms, the two or more verified writing samples and determine one or more unique writing characteristics of the target individual. For example, if the target individual uses certain words more often than others, sentence structure, punctuation conventions and other unique writing characteristics.

The program may create, through one or more AI/ML deepfake algorithms, a deepfake archive of fake writings of the target individual. The program may store the two or more verified writing samples, the one or more unique writing characteristics, and the deepfake archive in the database.

The program may search the network for one or more social media accounts that include the one or more unique writing characteristics. The program may compare the one or more social media accounts with the deepfake archive to determine whether the one or more social media accounts are illegitimate or legitimate. When the program determines that the one or more social media accounts are illegitimate, it may initiate a takedown request of the one or more social media accounts.

In an embodiment, one of the two or more verified writing samples may include a name of the target individual. The program may use the name in its search for fake or spoofed accounts or posts.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
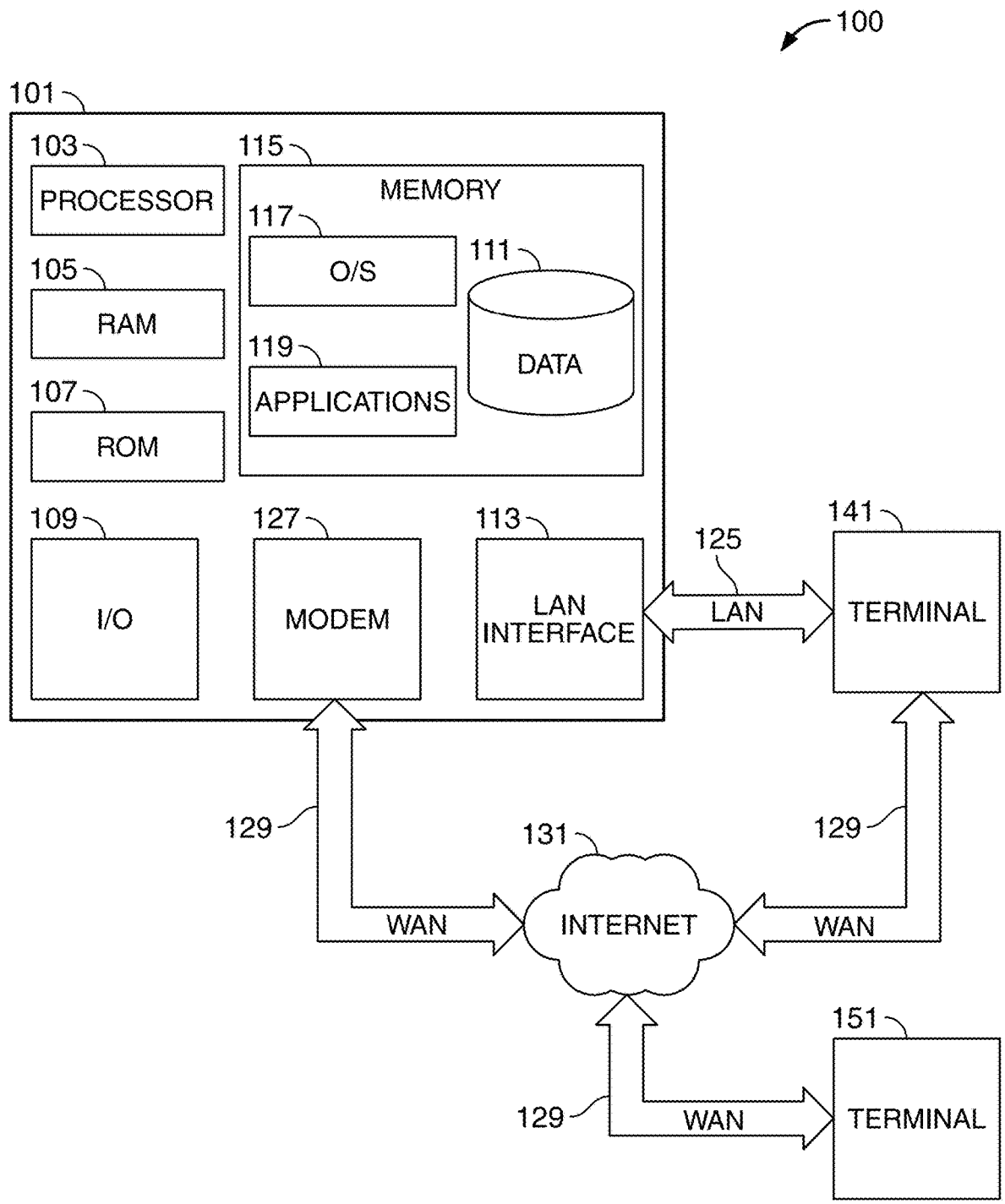
FIG. 1 shows an illustrative apparatus in accordance with principles of the disclosure.

It is an object of this disclosure to provide apparatus and methods for using deepfakes defensively.

A defensive deepfake computer program product is provided. The computer program product may include executable instructions. The executable instructions may be stored on non-transitory memory. The executable instructions may be executed by a processor on a computer system to perform various functions.

Multiple processors may increase the speed and capability of the program. The executable instructions may be stored in non-transitory memory on the computer system or a remote computer system, such as a server.

Other standard components of a computer system may be present. The computer system may be a server, mobile device, or other type of computer system. A server or more powerful computer may increase the speed at which the computer program may run. Portable computing devices, such as a smartphone, may increase the portability and useability of the computer program, but may not be as secure or as powerful as a server or desktop computer.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The computer system may be a server. The computer program may be run on a smart mobile device. The computer program, or portions of the computer program may be linked to other computers or servers running the computer program. The server or servers may be centralized or distributed. Centralized servers may be more powerful and secure than distributed servers but may also be more expensive.

The program may gather two or more verified images of a target individual or entity. The images may be stills from a video. The images may include videos.

The program may proactively research and gather verified images from the Internet, a database, or elsewhere. In an embodiment, the program may receive the verified images. The program may receive the verified images from the target individual, from an administrator, or from another trusted source.

The images may be verified by the target individual or another trusted source. For example, the targeted individual may provide the program with two or more images and verify to the program that they are unaltered images of the individual.

In an embodiment, the program may use a camera connected to the computer system to take still or video images of the target individual. The camera may be remote from the computer system but in electronic communication with the computer system, over the Internet or another network.

In an embodiment, the program may request the target individual take two or more photographs or videos of the individual through the individual's smart mobile device, such as a smartphone. For example, the program may transmit a text message or other link to the individual's mobile phone. When the link is opened, the mobile phone's camera may activate and take multiple images or videos of the individual. The individual may be able to choose which images are transmitted back to the program.

The program may analyze the two or more verified images to determine one or more unique facial characteristics of the target individual or entity. The unique facial characteristics may be features of the target individual that allow the program to identify the target individual. For example, distance between eyes, color of eyes, shape of nose, other measurements, and other characteristics. The more unique facial characteristics identified, the more accurate any identification of the individual may be. The analysis may be performed with standard facial recognition software or algorithms.

The analysis may be performed through one or more artificial intelligence/machine learning ("AI/ML") algorithms. The more verified images gathered by or provided to the program, the stronger and more accurate the analysis may be. Any suitable AI/ML algorithm may be used, and multiple algorithms may be appropriate for analyzing more verified images.

In an embodiment, if the gathered images are insufficient for the program, the program may request the target individual provide further images or videos.

The program may create, through one or more AI/ML deepfake algorithms, one or more deepfake images of the target individual or entity. Any standard, existing, or future deepfake algorithm may be used. As deepfake algorithms improve in quality, the deepfake images may improve in quality as well. The deepfake algorithm(s) may be provided to the program.

In an embodiment, the program may automatically search the Internet, including the darkweb (websites without a searchable url), at predetermined intervals for additional, new, and improved deepfake algorithms.

In an embodiment, the program may create multiple deepfake images using multiple deepfake algorithms. As malicious actors may use a variety of deepfake algorithms, the more deepfake algorithms used by the program, the more accurate the program may become.

The deepfake images created by the program may be used by the program as exemplars of what a malicious actor may use in a spoofed or fake account or post. The more, and more varied, deepfakes created by the program, the more exemplars the program may have to learn from and discover fake or spoofed accounts or posts.

The program may store the two or more verified images, the one or more unique facial characteristics, and the one or more deepfake images in a database. In an embodiment, the two or more verified images will not be stored by the program. The database may be present on the same computer as the program or may be on a server or other computer distant from the program. The database may be accessible by the program. The database may be accessible by an administrator of the program. In an embodiment, the database may not be accessible by an administrator, for security purposes.

The program may search a network for one or more social media accounts that include the one or more unique facial characteristics. The network may be the Internet. The program may utilize a list of targeted social media websites and applications to search instead of searching the entire network or Internet. The list of social media websites and applications searched by the program may be static. The list may be dynamic. The list may be updated automatically by the program, as new social media websites and applications are created. The list may be updated by a developer or administrator of the program.

The search may also include other characteristics of the target individual or entity, such as a name or names, account names, and other characteristics. For example, the program may first search for accounts or posts with the same name as the targeted individual or entity, and then search for deepfake images within those accounts and then search outside those accounts.

The program may compare any images on the one or more social media accounts with the one or more deepfake images and verified images. The program may determine when the one or more social media accounts are illegitimate through this comparison. For example, a social media account with a deepfake image may be illegitimate, while a social media account using the verified images may be legitimate. In some instances, an account using the verified images may be illegitimate (i.e., the account could have copied real images instead of faking images). The program may determine that an account using the verified images is illegitimate by comparing other data on the account, such as names and other information.

When the one or more social media accounts are determined to be illegitimate, the program may initiate a takedown request of the one or more social media accounts. The takedown request may be transmitted automatically. The takedown request may be transmitted after receiving permission from a program administrator. The takedown request may be transmitted to the entity or person running the website or application on which the illegitimate account was located.

The transmission may be encrypted. The transmission may be over the Internet, through a cellular connection, bluetooth, wi-fi, a local area network, or any other suitable communication protocol.

In an embodiment, the program may also request a response from a system administrator as to whether the determination that the one or more social media accounts are illegitimate is correct. In an embodiment, the program may also request a response from a system administrator as to whether the determination that the one or more social media accounts are legitimate is correct. For example, if the program determines that account X is illegitimate or that account Y is legitimate, the program may transmit the details of account X or Y to an administrator for a human in the loop determination. This determination may be used to refine the comparison algorithm or other algorithms of the program. The human in the loop determination may also increase the accuracy of the program, so that the program will not transmit unfounded takedown requests.

In an embodiment, the system administrator may be the target individual. In this embodiment, the program may request the target individual verify or reject the determination that the social media account (s) are fake or spoofed, or that an account or post is legitimate.

In an embodiment, the database may be encrypted. Any suitable encryption method may be used. Encryption may prevent a malicious actor from attacking the database and gaining verified images and deepfake images. Encryption may also increase the privacy of the targeted individual.

In an embodiment, the one or more facial characteristics, deepfake images, and other determinations may be repeatedly refined. The program may take feedback or analysis through AI/ML algorithms to refine various aspects of its operation, including the determination of facial characteristics, other characteristics, creation of deepfakes, comparison of accounts or posts to deepfakes, and determination of legitimate vs. illegitimate accounts or posts. Any suitable AI/ML algorithms may be used, and multiple algorithms may be appropriate for analyzing more complex images, accounts, and feedback.

In an embodiment, the one or more social media accounts may include one or more photographs, one or more written posts, as well as other types of data. Social media accounts may include various types of data, which may be dependent on the social media website or application, as some sites may allow for certain types of data (e.g., videos), while others may not.

In an embodiment, the program may also gather two or more verified writing samples of the target individual, separate from or in addition to the verified images. As with the verified images, the verified writing samples may be gathered automatically by the program or provided to the program by the target individual or others. The more verified writing samples gathered by the program, the more accurate the program's determinations may be. Additional verified writing samples may increase the program's accuracy by providing more data for the program to analyze.

The program may analyze, through one or more artificial intelligence/machine learning ("AI/ML") algorithms, the two or more verified writing samples and determine one or more unique writing characteristics of the target individual. Multiple unique writing characteristics may be required for accurate determinations of legitimacy or illegitimacy.

Unique writing characteristics may include, inter alia: the target individual uses certain words more often than others, sentence structure, punctuation conventions and other unique writing characteristics.

In an embodiment, any language, including English, may be used. Multiple languages may allow for the program to cast a wider net when searching for illegitimate accounts or posts.

The program may create, through one or more AI/ML deepfake algorithms, a deepfake archive of fake writings of the target individual. The program may use the same or different deepfake algorithms to generate the deepfake archive of fake writings. The more fake writings generated by the program, the more accurate the program may be.

The program may store the two or more verified writing samples, the one or more unique writing characteristics, and the deepfake archive in the database. The database may be encrypted with any suitable encryption algorithm or method. Encrypting the database may increase the targeted individual's privacy and prevent malicious activity from gaining the output of the program as well as other data.

The program may search the network for one or more social media accounts that include the one or more unique writing characteristics. The network may be the Internet. The program may utilize a list of targeted social media websites and applications to search instead of searching the entire network or Internet. The list of social media websites and applications searched by the program may be static. The list may be dynamic. The list may be updated automatically by the program, as new social media websites and applications are created. The list may be updated by a developer or administrator of the program.

The search may also include other characteristics of the target individual or entity, such as image (s), a name or names of the target individual, account names, and other characteristics. For example, the program may first search for accounts or posts with the same name as the targeted individual or entity, and then search for deepfake writings within those accounts and then search outside those accounts.

The program may compare the one or more social media accounts with the deepfake archive to determine whether the one or more social media accounts are illegitimate or legitimate. When the program determines that the one or more social media accounts are illegitimate, it may initiate a takedown request of the one or more social media accounts. The takedown request may be automatically generated and transmitted. In an embodiment, the takedown request may be approved by an administrator before transmission.

A defensive deepfake computer program product is provided. The computer program product may include executable instructions. The executable instructions may be stored on non-transitory memory. The executable instructions may be executed by a processor on a computer system to perform various functions.

The program may gather two or more verified writing samples of a target individual or entity.

The program may analyze the two or more verified writing samples to determine one or more unique writing characteristics of the target individual or entity. The analysis may be performed through one or more artificial intelligence/machine learning ("AI/ML") algorithms.

The program may create, through one or more AI/ML deepfake algorithms, a deepfake archive of deepfake writings that may be confused for the verified writings of the target individual or entity. The deepfake writings may be used as exemplars of what a malicious actor may use in a spoofed or fake account or post.

The program may store the two or more verified writings, the one or more unique writing characteristics, and the deepfake archive in a database. The database may be present on the same computer as the program or may be on a server or other computer distant from the program.

The program may search a network for one or more social media accounts or social media posts that include the one or more unique writing characteristics. The network may be the Internet. The search may also include other characteristics of the target individual or entity, such as an image, a name or names, account names, and other characteristics.

The program may compare any writings on the one or more social media accounts or posts with the deepfake archive. The program may determine when the one or more social media accounts are illegitimate through this comparison. For example, a social media account with a deepfake writing may be illegitimate.

When the one or more social media accounts are determined to be illegitimate, the program may initiate a takedown request of the one or more social media accounts.

In an embodiment, the deepfake archive may also include one or more deepfake images of the target individual.

In an embodiment, the program may initiate the takedown request of the one or more social media accounts by transmitting a demand to a developer of the one or more social media accounts. Other methods to take down the one or more social media accounts may also be used.

In an embodiment, the program may also block access within an internal network to the one or more social media accounts. For example, an entity may block any computer on its network from accessing a spoofed or hoax account of an employee or customer, or anyone else.

In an embodiment, the program may also request a response from a system administrator as to whether the determination that the one or more social media accounts are illegitimate is correct. For example, if the program determines that account Z is illegitimate, the program may transmit the details of account Z to an administrator for a human in the loop determination. This determination may be used to refine the comparison algorithm or other algorithms of the program.

In an embodiment, the system administrator may be the target individual. In this embodiment, the program may request the target individual verify or reject the determination that the social media account (s) are fake or spoofed.

In an embodiment, when the system administrator responds that the determination is incorrect, the program may refine the search of the network, as well as refine any of its other functions.

A method for utilizing deepfake images defensively is provided. The method may include the step of gathering, at a defensive deepfake computer program, two or more verified images of a target individual.

The method may include analyzing, by the program through one or more artificial intelligence/machine learning ("AI/ML") algorithms, the two or more verified images to determine one or more unique facial characteristics of the target individual.

The method may include the step of creating, by the program through one or more AI/ML deepfake algorithms, one or more deepfake images of the target individual. The method may include the step of storing the two or more verified images, the one or more unique facial characteristics, and the one or more deepfake images in a database.

In an embodiment, the program may analyze the deepfake images to learn and iteratively train the program to detect modified deepfake images. For example, the program may analyze the created deepfake images (or writings) to ascertain certain characteristics of deepfake images (or writings) that the program would recognize when reviewing social media accounts or posts.

The method may include the step of the program searching a network for one or more social media accounts or posts that include the one or more unique facial characteristics. The network may be the Internet.

The method may include the step of the program comparing the one or more social media accounts or posts with the one or more deepfake images to determine when the one or more social media accounts or posts are illegitimate. When the program determines that the one or more social media accounts or posts are illegitimate, the method may include the step of the program initiating a takedown request of the illegitimate one or more social media accounts or posts.

In an embodiment, the method may include the defensive deepfake computer program being executed on an apparatus. The apparatus may include a computer. The computer may be a server, desktop computer, mobile computer, tablet, or other type of computer.

The computer may include a communication link, a processor or processors, and a non-transitory memory configured to store executable data configured to run on the processor, among other components. The executable data may include an operating system and the defensive deepfake computer program.

A processor (s) may control the operation of the apparatus and its components, which may include RAM, ROM, an input/output module, and other memory. The microprocessor may also execute all software running on the apparatus. Other components commonly used for computers, such as EEPROM or Flash memory or any other suitable components, may also be part of the apparatus.

A communication link may enable communication with a recipient computer as well as any server or servers. The communication link may include any necessary hardware (e.g., antennas) and software to control the link. Any appropriate communication link may be used. In an embodiment, the network used may be the Internet. In another embodiment, the network may be an internal intranet.

In an embodiment, the method may also include the following steps, among others. The step of gathering, by the defensive deepfake computer program, two or more verified writings of the target individual. The step of analyzing, by the program through one or more artificial intelligence/ machine learning ("AI/ML") algorithms, the two or more verified writings to determine one or more unique writing characteristics of the target individual. The step of creating, by the program through one or more AI/ML deepfake algorithms, a deepfake archive of fake writings of the target individual. The step of storing the two or more verified writings, the one or more unique writing characteristics, and the deepfake archive in the database. The step of searching, by the program, the network for one or more written social media posts or accounts that include the one or more unique writing characteristics. The step of comparing, by the program, the one or more social media posts with the deepfake archive to determine when the one or more social media posts are illegitimate. When the one or more social media posts are illegitimate, the step of initiating, by the program, a takedown request of the one or more social media posts.

In an embodiment, the program may determine that the illegitimate one or more social media posts are on a legitimate social media account. In this embodiment, the program may initiate a takedown request of only the illegitimate post (or posts) and not the entire social media account.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or a human, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as a defensive deepfake program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application (s) 119 (such as a defensive deepfake program and security protocols) along with any other data 111 (information about each target individual or entity) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application (s) (such as a defensive deepfake program and security protocols) along with any data needed for the operation of the apparatus and to allow authentication of a user. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program (s) 119 (which may be alternatively referred to herein as "plugins," "applications," or "apps") may include computer executable instructions for a defensive deepfake program and security protocols, as wells as other programs. In an embodiment, one or more programs, or aspects of a program, may use one or more AI/ML algorithm (s). The various tasks may be related to using deepfakes to determine the legitimacy or illegitimacy of social media accounts or posts.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
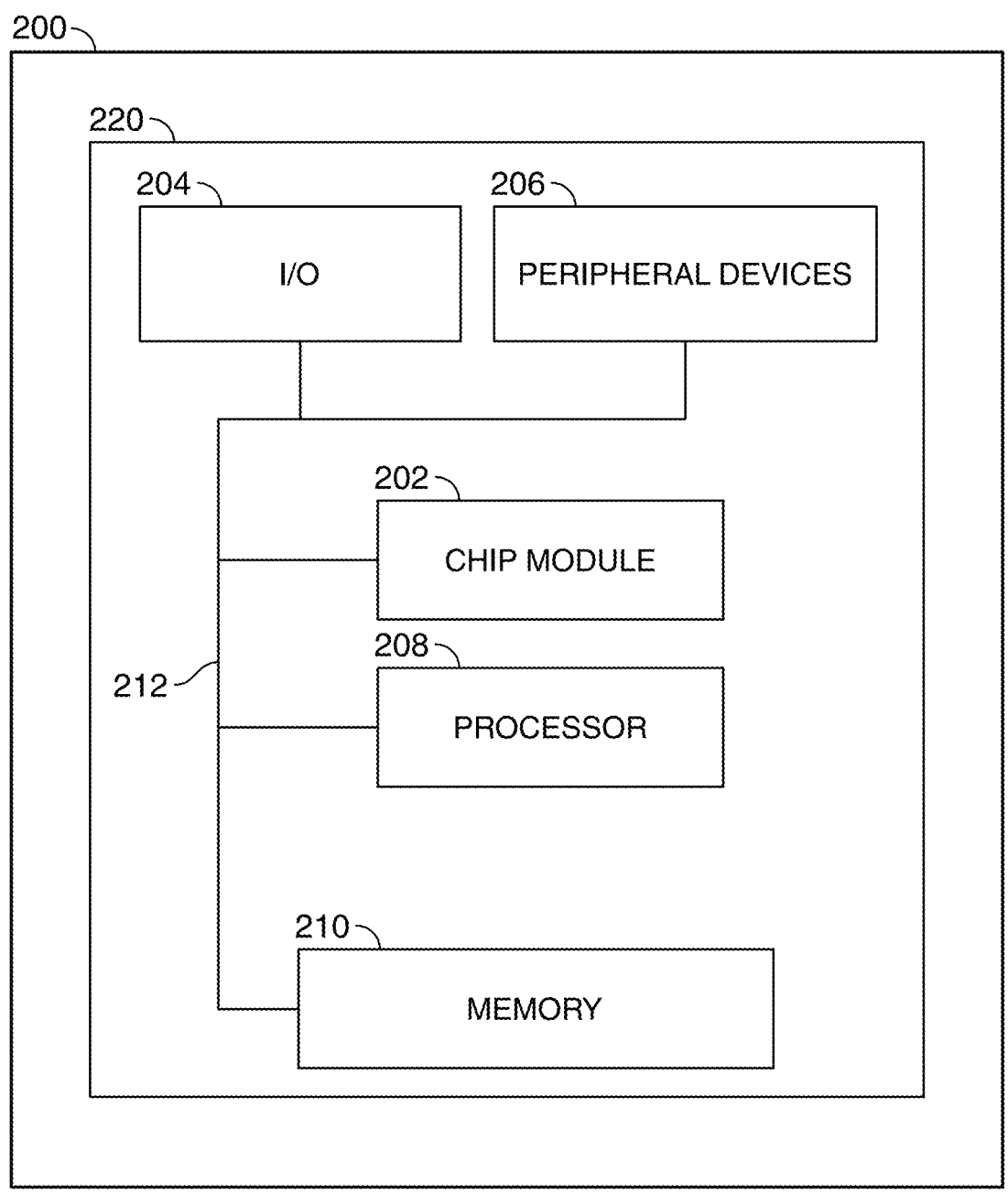
FIG. 2 shows an illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1, 3, and 6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
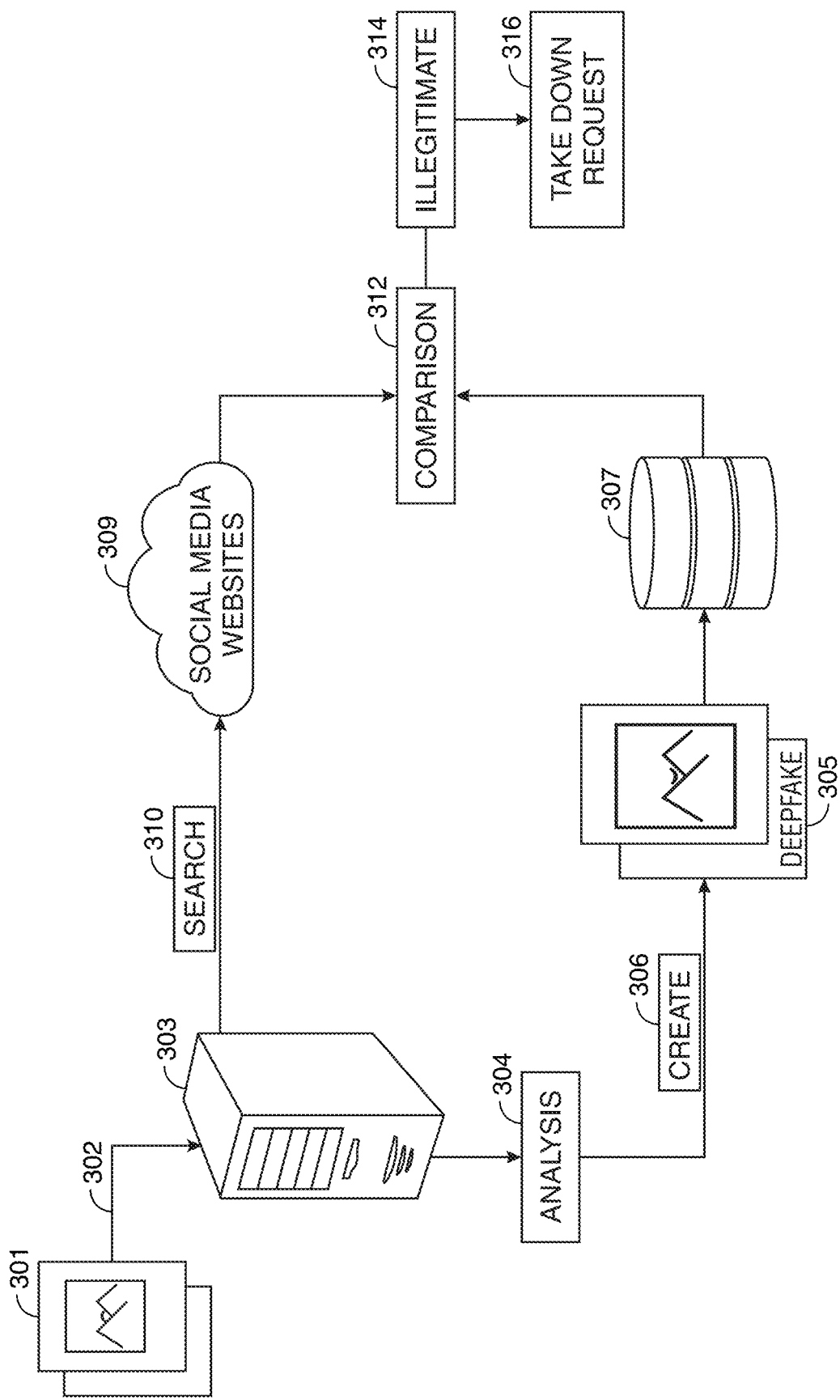
FIG. 3 shows an illustrative schematic in accordance with principles of the disclosure.

FIG. 3 shows an illustrative schematic in accordance with principles of the disclosure. Apparatus may include any of the components and systems odd-numbered 301 through 309, among other components. Methods may include some or all of the method steps even-numbered 302 through 316. Methods may include the steps illustrated in FIG. 3 in an order different from the illustrated order. The illustrative method shown in FIG. 3 may include one or more steps performed in other figures or described herein. Steps 302 through 316 may be performed on the apparatus shown in FIG. 3 or other apparatus shown in other figures or elsewhere.

At step 302, a computer 303 running a defensive deepfake program (not shown) may gather verified images and writings 301 from a target individual. The program may analyze the verified images and writings 301 at step 304. At step 306, the program may create deepfake images and writings 305. At step 308, the program may store the created deepfake images and writings 305 in a database 307.

At step 310, the program may search a network 309, such as the Internet, for social media accounts and posts that may include fake or spoofed accounts or posts.

At step 312, the program may compare the social media accounts and posts with the data stored in database 307 to determine if the social media accounts and posts are legitimate or illegitimate.

When the program determines that the social media accounts or posts are illegitimate at step 314, at step 316, the program may transmit a takedown request to the operator of the social media website or application where the illegitimate account or post resides.

Figure 4:
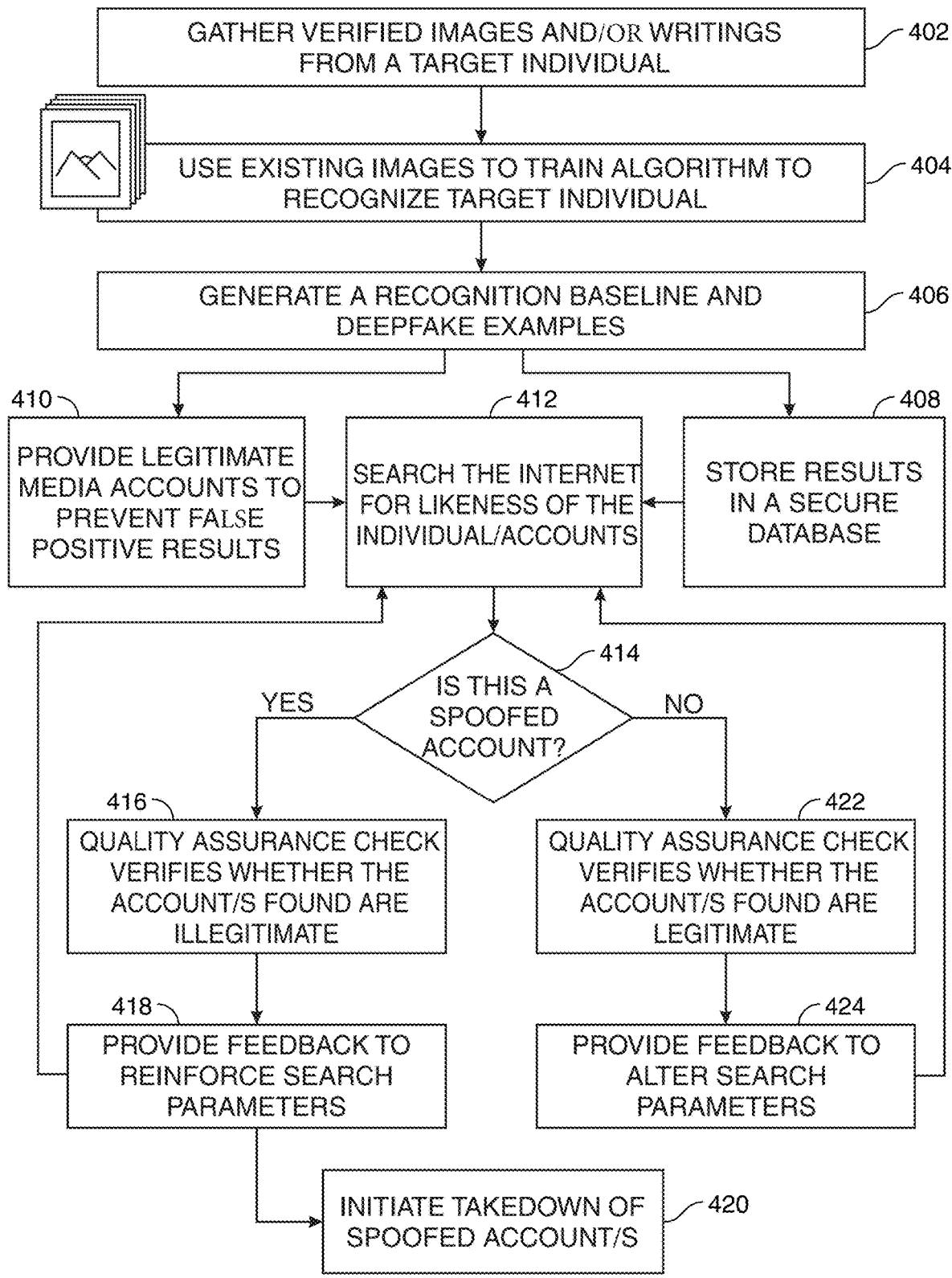
FIG. 4 shows an illustrative flowchart in accordance with principles of the disclosure.

FIG. 4 shows an illustrative flowchart in accordance with principles of the disclosure. Methods may include some or all of the method steps numbered 402 through 424. Methods may include the steps illustrated in FIG. 4 in an order different from the illustrated order. The illustrative method shown in FIG. 4 may include one or more steps performed in other figures or described herein. Steps 402 through 424 may be performed on the apparatus shown in FIGS. 1-3, and 6 or other apparatus.

At step 402, a defensive deepfake computer program may gather verified images and writings from a target individual. The verified images and writings may be transmitted to the program or the program may gather them from a network, such as the Internet. In an embodiment, the target individual may provide access to a verified social media account to the program, where the program may then mine the verified social media account for data (images, writings, name, etc.) relating to the target individual.

At step 404, the program may use the verified images and writings to train a deepfake AI/ML algorithm to recognize the target individual's likeness and writings. At step 406, the program may generate a recognition baseline along with deepfake examples. The baseline and deepfake examples may be used to train the program to recognize and differentiate between legitimate and illegitimate social media accounts and posts. At step 408, the results of the program may be stored in a database.

At step 410, the target individual may provide legitimate, verified, social media accounts and posts to the program so that the program knows that those accounts and posts are legitimate.

At step 412, the program may search the Internet (or other network) for social media accounts and posts that include a likeness of the individual's images or writings. The likeness may be a (unauthorized) copy of the target individual's images or writings, or a deepfake version of the images/writings.

For every non-verified social media account or post discovered at step 412, at step 414, the program may determine if the account or post is legitimate or illegitimate (spoofed). The program may compare the contents of the discovered accounts or posts with the results stored in the database at 408.

At step 416, when the program determines the accounts or posts are illegitimate, the program may transmit the information to a system administrator or other human user for a quality assurance check and verification that the accounts are illegitimate. In an embodiment, the human user may be the target individual.

At step 418, the human user may provide feedback to the program to reinforce the search parameters and other algorithms within the program. For example, the user may inform the program that it was correct or incorrect in its search and comparison results. The user may state that the social media account found was not an actual social media account. Or the user may state that the social media account or post was actually legitimate.

At step 420, the program may initiate a takedown of the spoofed or fake social media accounts or posts. The program may transmit a request to the website or application on which the spoofed or fake account or post was found requesting the account or post be removed. In an embodiment, the program may also prohibit access to the spoofed or fake account from an internal network or other network. For example, if the program finds a spoofed or fake account impersonating a customer of an entity, the program may block access from the entity's employees to the spoofed or fake account. This may prevent a malicious actor from impersonating the customer to the entity's employees.

At step 422, when the program determines the account or post is legitimate, the program may transmit the information to a system administrator or other human user for a quality assurance check and verification that the accounts or posts are legitimate. In an embodiment, the human user may be the target individual.

At step 424, the human user may provide feedback to the program to reinforce the search parameters and other algorithms within the program. For example, the user may inform the program that it was correct or incorrect in its search and comparison results. The user may state that the social media account found was not an actual social media account. Or the user may state that the social media account or post was actually illegitimate.

Figure 5:
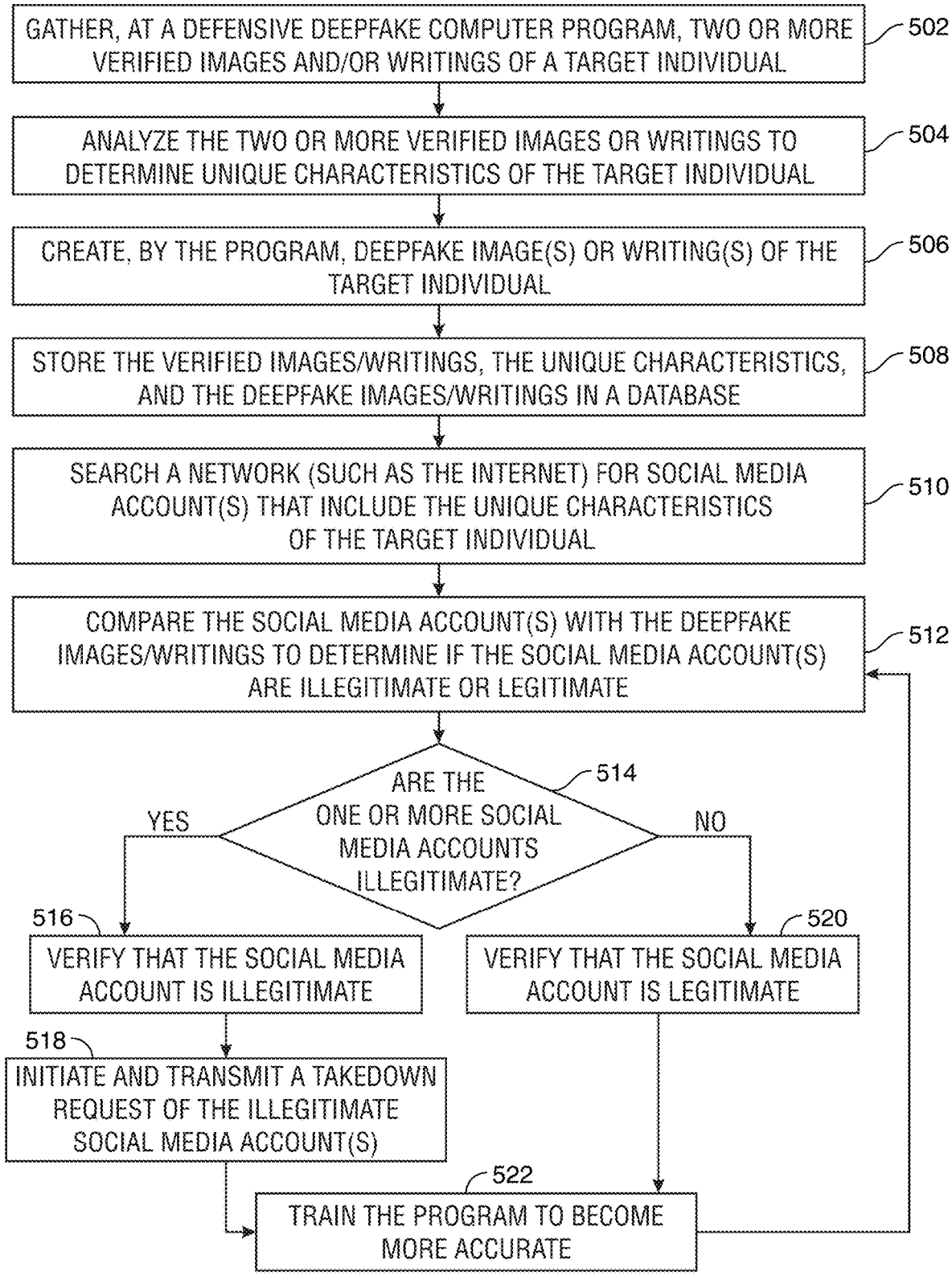
FIG. 5 shows an illustrative flowchart in accordance with principles of the disclosure.

FIG. 5 shows an illustrative flowchart in accordance with principles of the disclosure. Methods may include some or all of the method steps numbered 502 through 522. Methods may include the steps illustrated in FIG. 5 in an order different from the illustrated order. The illustrative method shown in FIG. 5 may include one or more steps performed in other figures or described herein. Steps 502 through 522 may be performed on the apparatus shown in FIGS. 1-3, and 6, or other apparatus.

At step 502, a defensive deepfake computer program (on a server or other computer system) may gather two or more verified images or writings of a target individual. The target individual or other user may provide the images/writings to the program, or the program may gather the images/writings from an outside source, such as a verified social media account.

At step 504, the program may analyze the images/writings to determine unique characteristics (images or writing) of the target individual. This may be referred to as a baseline of the target individual.

At step 506, the program may create deepfake images or writings of the target individual, based on the analysis and gathered images/writings. Any suitable deepfake algorithm(s) may be used, and the more deepfake exemplars created, the more accurate the program may be when determining if a social media account or post is legitimate or illegitimate.

At step 508, the program may store the verified images/writings, the analysis (baseline), and the deepfake images/writings in a database. The database may be located on the same computer system as the program or a remote computer system. The database may be encrypted.

At step 510, the program may search a network (which may be the Internet) for social media accounts or posts that include the unique characteristics (baseline) of the target individual. Any accounts or posts found may be legitimate or illegitimate (spoofed or fake).

At step 512, the program may compare the social media accounts or posts found in step 510 with the deepfake images/writings it created to determine whether the accounts or posts are legitimate or not. An account or post that includes a deepfake image/writing may be more likely to be illegitimate than an account that does not include any deepfakes. The comparison may be to a pre-determined threshold level of legitimacy, such as 51%, or 75%. The lower the level, the more legitimate accounts the program may determine incorrectly as illegitimate. Conversely, the higher the level, the more illegitimate accounts the program may determine as legitimate, incorrectly. The level may be modified by a user or system administrator.

In an embodiment, the program may automatically modify the threshold level as it learns from past history. For example, if the program is generating too many false positives (illegitimate accounts or posts), it may raise the threshold level.

At step 514, the program may make the determination of legitimacy or illegitimacy.

In some embodiments, at step 516, when an account or post is determined to be illegitimate, the program may verify its determination. The program may verify by asking an administrator, other user, or the target individual to make a determination of legitimacy or illegitimacy.

When the illegitimacy is verified or confirmed, at step 518, the program may initiate and transmit a takedown request to the website or application on which the illegitimate account or post appears. The program may take further action (e.g., repeating the takedown request, restricting access to the website or application) as necessary to ensure the illegitimate account or post is removed.

In some embodiments, at step 520, when an account or post is determined to be legitimate, the program may verify its determination. The program may verify by asking an administrator, other user, or the target individual to make a determination of legitimacy or illegitimacy.

At step 522, the program may take any results of the comparison and verification (steps 512-520) to train itself to become more accurate iteratively. For example, if a human reviewer consistently determines that the program is inaccurate at steps 516 and 520, the program may refine its search, comparison, and analysis algorithm(s) to become more accurate and reduce its error rate.

Figure 6:
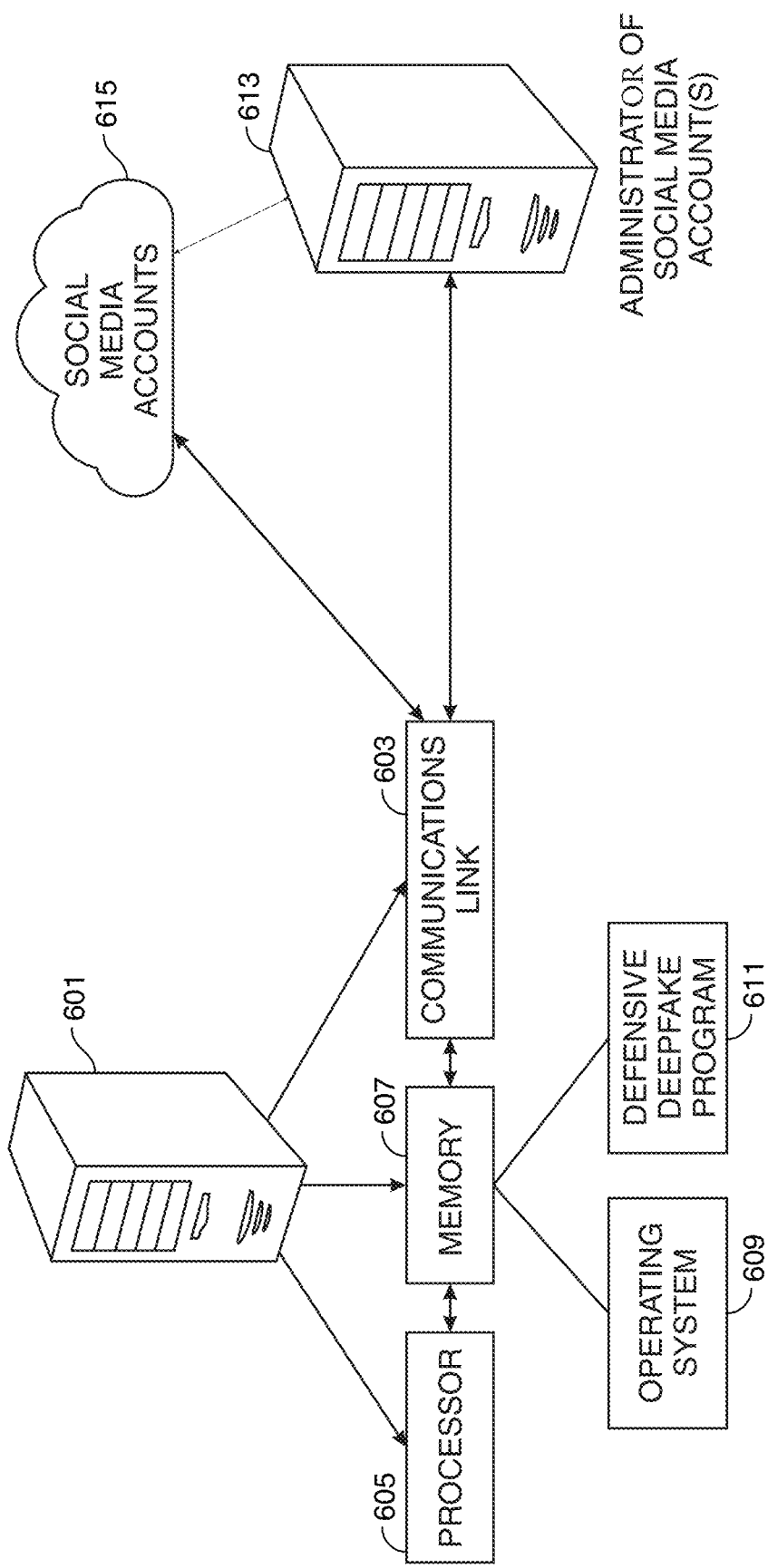
FIG. 6 shows an illustrative apparatus in accordance with principles of the disclosure.

FIG. 6 shows an illustrative apparatus in accordance with principles of the disclosure. A server/computer 601 may include a communication link 603, a processor/processors 605, and a non-transitory memory 607, as well as other components.

The non-transitory memory 607 may include an operating system 609, and a defensive deepfake program 611, as well as other data and programs.

The communications link 603 may communicate with the internet/cloud 615 to find social media accounts/posts that may be legitimate or illegitimate, and an administrator of the social media accounts/posts 613, along with other destinations.

The communications link 603 may communicate directly or indirectly with the cloud 615 or administrator 613. An external network may be the Internet. An internal network may be an intranet. An internal network may use Internet protocols.

Thus, apparatus and methods for using deepfakes defensively to detect fake, spoofed, and hoax accounts and posts on social media and elsewhere and then target those fake and spoofed accounts and posts for removal and deletion are provided. Persons skilled in the art will appreciate that the present invention can be practiced by other than the described embodiments, which are presented for purposes of illustration rather than of limitation.

What is claimed is:

1. A defensive deepfake computer program product, the computer program product comprising executable instructions, the executable instructions stored on a non-transitory computer-readable storage medium, when the executable instructions executed by a processor on a computer system cause the processor to:

gather two or more verified images of a target individual;
analyze, through one or more artificial intelligence/machine learning ("AI/ML") algorithms, the two or more verified images to determine one or more unique facial characteristics of the target individual;
create, through one or more AI/ML deepfake algorithms, one or more deepfake images of the target individual;
store the one or more unique facial characteristics, and the one or more deepfake images in a database;
search a network for one or more social media accounts that include the one or more unique facial characteristics; and
determine when the one or more social media accounts are illegitimate by comparing the one or more social media accounts with the one or more deepfake images.

2. The defensive deepfake computer program product of claim 1 wherein the executable instructions further request a response from a system administrator whether the determination that the one or more social media accounts are illegitimate is correct.

3. The defensive deepfake computer program product of claim 2 wherein the system administrator is the target individual.

4. The defensive deepfake computer program product of claim 1 wherein the network is the Internet.

5. The defensive deepfake computer program product of claim 1 wherein the database is encrypted.

6. The defensive deepfake computer program product of claim 1 wherein the one or more facial characteristics are repeatedly refined.

7. The defensive deepfake computer program product of claim 1 wherein the one or more deepfake images are repeatedly refined.

8. The defensive deepfake computer program product of claim 1 wherein the one or more social media accounts comprise one or more photographs.

9. The defensive deepfake computer program product of claim 1 wherein the executable instructions further:
gather two or more verified writing samples of the target individual;
analyze, through one or more artificial intelligence/machine learning ("AI/ML") algorithms, the two or more verified writing samples to determine one or more unique writing characteristics of the target individual;
create, through one or more AI/ML deepfake algorithms, a deepfake archive of fake writings of the target individual;
store the one or more unique writing characteristics, and the deepfake archive in the database;
search the network for one or more social media accounts that include the one or more unique writing characteristics; and
determine when the one or more social media accounts are illegitimate by comparing the one or more social media accounts with the deepfake archive.

10. The defensive deepfake computer program product of claim 9 wherein one of the two or more verified writing samples includes a name of the target individual.

11. A defensive deepfake computer program product, the computer program product comprising executable instructions, the executable instructions stored on a non-transitory computer-readable storage medium, when the executable instructions executed by a processor on a computer system cause the processor to:
gather two or more verified writings of a target individual;
analyze, through one or more artificial intelligence/machine learning ("AI/ML") algorithms, the two or more verified writings to determine one or more unique writing characteristics of the target individual;
create, through one or more AI/ML deepfake algorithms, a deepfake archive of fake writings of the target individual;
store the one or more unique writing characteristics, and the deepfake archive in a database;
search a network for one or more social media accounts that include the one or more unique writing characteristics; and
determine when the one or more social media accounts are illegitimate by comparing the one or more social media accounts with the deepfake archive.

12. The defensive deepfake computer program product of claim 11 wherein the deepfake archive further comprises one or more deepfake images of the target individual.

13. The defensive deepfake computer program product of claim 11 wherein when the one or more social media accounts are illegitimate, the executable instructions initiate a takedown request of the one or more social media accounts by transmitting a demand to a developer of the one or more social media accounts.

14. The defensive deepfake computer program product of claim 11 wherein the executable instructions further block access within an internal network to the one or more social media accounts.

15. The defensive deepfake computer program product of claim 11 wherein the executable instructions further request a response from a system administrator whether the determination that the one or more social media accounts are illegitimate is correct.

16. The defensive deepfake computer program product of claim 15 wherein when the system administrator responds that the determination is incorrect, the executable instructions refine the search of the network.

17. A method for utilizing deepfake images defensively, the method comprising the steps of:
gathering, at a defensive deepfake computer program, two or more verified images of a target individual;
analyzing, by the program through one or more artificial intelligence/machine learning ("AI/ML") algorithms, the two or more verified images to determine one or more unique facial characteristics of the target individual;
creating, by the program through one or more AI/ML deepfake algorithms, one or more deepfake images of the target individual;
storing, the one or more unique facial characteristics, and the one or more deepfake images in a database;
analyzing the deepfake images to train the program to detect modified deepfake images;
searching, by the program, a network for one or more social media accounts that include the one or more unique facial characteristics; and
comparing, by the program, the one or more social media accounts with the one or more deepfake images to determine when the one or more social media accounts are illegitimate.

18. The method of claim 17 wherein the defensive deepfake computer program is executed on an apparatus comprising a computer, the computer comprising:
a communication link;
a processor; and
a non-transitory memory configured to store executable data configured to run on the processor comprising:
an operating system; and
the defensive deepfake computer program.

19. The method of claim 17 further comprising the steps of:
- gathering, by the defensive deepfake computer program, two or more verified writings of the target individual;
- analyzing, by the program through one or more artificial intelligence/machine learning ("AI/ML") algorithms, the two or more verified writings to determine one or more unique writing characteristics of the target individual;
- creating, by the program through one or more AI/ML deepfake algorithms, a deepfake archive of fake writings of the target individual;
- storing the one or more unique writing characteristics, and the deepfake archive in the database;
- searching, by the program, the network for one or more written social media posts that include the one or more unique writing characteristics; and
- comparing, by the program, the one or more social media posts with the deepfake archive to determine when the one or more social media posts are illegitimate.

20. The method claim 19 wherein the illegitimate one or more social media posts appear on a legitimate social media account.

* * * * *